United States Patent [19]

Hanamoto et al.

[11] 4,157,406

[45] Jun. 5, 1979

[54] PROCESS FOR IMPROVING BAKING PROPERTIES OF UNBLEACHED CAKE FLOUR

[75] Inventors: Max M. Hanamoto, Lafayette; Maura M. Bean, Berkeley, both of Calif.

[73] Assignee: The United States of America as represented by the Secretary of Agriculture, Washington, D.C.

[21] Appl. No.: 768,917

[22] Filed: Feb. 15, 1977

[51] Int. Cl.$^2$ .......................... A21D 2/36; A21D 6/00
[52] U.S. Cl. .................................. 426/622; 426/443; 426/465; 426/661
[58] Field of Search ............... 426/618, 622, 443, 445, 426/450, 465, 496, 661; 127/69, 71

[56] References Cited

U.S. PATENT DOCUMENTS

| | | |
|---|---|---|
| 1,452,871 | 4/1923 | Dienst .................................. 426/465 |
| 2,929,748 | 3/1960 | Schwandt ............................. 127/71 |
| 3,428,461 | 2/1969 | Hatton et al. ........................ 426/555 |
| 3,490,917 | 1/1970 | Doe ...................................... 426/622 |
| 3,711,297 | 1/1973 | Strobel et al. ....................... 426/622 |
| 3,869,558 | 3/1975 | Hampton et al. .................... 426/443 |
| 3,974,298 | 8/1976 | Cauvain et al. .................. 426/622 X |

*Primary Examiner*—Joseph M. Golian
*Assistant Examiner*—Esther M. Kepplinger
*Attorney, Agent, or Firm*—M. Howard Silverstein; David G. McConnell; Theodore J. Leitereg

[57] ABSTRACT

Unbleached cake flour is heated at a temperature of 49°–93° C. for 1 hour to ten weeks to improve its baking properties. Starch is subjected to controlled swelling by heating in the presence of excess moisture at a temperature of 54°–71° C. Either treated material or mixtures of both may be substituted for unbleached flour in high-sugar baked good mixes to obtain improved baking properties such as texture, grain, volume, and eating quality.

4 Claims, No Drawings

PROCESS FOR IMPROVING BAKING PROPERTIES OF UNBLEACHED CAKE FLOUR

BACKGROUND OF THE INVENTION

1. Field of the Invention

This invention relates to and has among its objects the provision of novel methods for improving the baking properties of unbleached cake flour. Another object of the invention is to provide a process for the controlled swelling of starch. Further objects of the invention will be evident from the following description wherein parts and percentages are by weight unless otherwise specified.

2. Description of the Prior Art

As a matter of custom in the United States wheat flour is normally bleached with chlorine gas prior to its use in baking cakes. Bleaching the wheat flour improves the texture, grain, volume, and eating quality of cakes produced therefrom. Furthermore, the color of white cakes is improved when bleached flour is incorporated into the cake mix. As a result of the use of bleached flour, Americans have grown accustomed to cakes possessing the above-mentioned properties. For this reason and the fact that the chlorination process is both practical and economical, the use of bleached flour is firmly embedded in the American cake-baking industry.

In recent years, however, chemical treatments and chemical additives have become suspect and it is desirable to avoid such treatments and additives wherever possible. In addition, many foreign countries prohibit the use of bleached flour in their cake products. As a result, these countries do not import American products such as cake mixes and the like which contain chlorinated flour.

Alternatives to bleaching the flour have been actively sought over the last few years. The alternative treatments must avoid the use of chlorine, and chemicals in general, but still produce flour which will yield the type of cakes customarily obtained with bleached flour. One alternative to the chlorination method is to subject the flour to specified temperatures for limited periods of time. For example, flour can be heated at a temperature of 100° to 140° C. for about 30 minutes to a maximum period such that no dextrinisation of the starch occurs (U.S. Pat. No. 3,490,917). Likewise, according to U.S. Pat. No. 3,428,461 bread flour (i.e., hard wheat flour) can be heated to 66° to 182° C. for about 1 minute to 17 hours, preferably at 121° to 182° C. for about 10 to 80 minutes to render it suitable for cake mixes.

SUMMARY OF THE INVENTION

We have found that the baking properties of wheat flour can be improved without use of chlorine or other chemical agents. In accordance with one aspect of the present invention flour is heated at a temperature of 49°–93° C. for a period of 1 hour to ten weeks. The so-treated flour exhibits improved baking properties and may be used to prepare high-sugar baked goods, such as cakes and the like.

Further in accordance with the invention, starch can be treated to obtain limited swelling thereof. In the latter process starch is mixed with excess water and held at a temperature of 54°–71° C. for a period of time great enough to swell the starch granules but not so great as to cause fragmentation thereof. The so-prepared starch can be used in cake mixes to replace a portion of the unbleached flour and the resulting baked products exhibit improved properties.

A most important phase of the invention is that flour heat-treated in accordance with the invention can be mixed with starch which has been subjected to controlled swelling in accordance with the invention. Cakes prepared from cake mixes formulated thusly exhibit properties substantially more improved than those obtained when the products of each of the above treatments are employed separately and more improved than those produced from bleached flour.

An advantage of the invention then is that no chemicals are necessary to improve the baking properties of the flour. Consequently, the process of the invention does not pose a potential hazard to the health of those who consume the products. In addition, foreign countries will not prohibit cake mixes and the like prepared from flour which has been treated in accordance with the invention.

A further item is that the baking properties, such as texture, grain, and volume, of the flour and the starch are improved over those of unbleached flour. In addition, the texture, grain, and eating quality of products prepared from mixtures of flour heat-treated according to the method of the invention and starch which has been swelled according to the invention are better than the texture, grain, and eating quality of products prepared from bleached flour or products prepared from either the heat-treated flour or the controlled swelled starch of the invention.

Another advantage of the invention is that the eating quality of products prepared from flour and starch treated by the method of the invention is excellent. The so-prepared products possess a moistness not found in conventional cakes and other products. Furthermore, the baked products of the instant method do not crumble when eaten.

A final point is that the color of white cakes prepared from mixtures of the flour and starch of the invention is close to the white color associated with cakes prepared from bleached flour. This is an important factor in facilitating consumer acceptance of the instant products.

DESCRIPTION OF THE PREFERRED EMBODIMENTS

One aspect of the invention concerns heat treatment of unbleached cake flour, i.e., soft wheat flour used in high-sugar baked goods. In proceeding in accordance with the invention unbleached flour is stored at elevated temperatures. In general, the temperature of the flour should be about 49°–93° C. and the duration of the storage should be about one hour to ten weeks. For optimum results, the raw flour should be stored at 71° C. for about 4–5 days. It should be noted that prolonged heating of wheat flour at high temperatures imparts an undesirable toasted flavor to the flour. Consequently, if temperatures above 88° C. (i.e., from 88°–93° C.) are employed the period of storage should be less than 24 hours; the time period being less, the greater the temperature.

The flour may become partially dehydrated during the above heat treatment. If the moisture level of the flour has been reduced, it may be desirable to add water to the flour to restore its moisture to the natural level. It is within the compass of the invention to heat-treat flour in a closed container to minimize loss of moisture.

The so-prepared flour can be used to produce high-sugar baked goods such as cakes, etc., following conventional recipes. In preparing baked products containing flour heat-treated as described above, one merely substitutes the flour of the invention for the bleached flour required by the recipe. Other ingredients are added as in ordinary baking procedures.

Another phase of the invention deals with the limited swelling of starch induced by heat in the presence of excess moisture. Usually, about 1 to 10 parts of water are employed per part of starch with about 3 to 5 parts of water per part of starch being preferred. The starch is slurried with water and the slurry is heated at a temperature of about 54°–71° C. The pH of the slurry should be about 5.5–6, the ambient pH of the starch. The slurry should be heated for a period of time sufficient to swell the starch granules. However, the heating should not be continued to the point whereat the starch granules become fragmented. Usually, the slurry is heated for a period of about 5 to 60 seconds. In any event, the correct period of heating can be determined by pilot trials.

After the starch slurry has been treated as described above, it can be used directly with conventional ingredients to produce baked products with improved properties. On the other hand, the starch slurry can be treated to remove excess water therefrom. Such conventional separation techniques as filtration, centrifugation, and the like may be used to remove bulk amounts of water. The so-recovered starch can then be dried and used in place of unbleached flour in conventional recipes for baked goods. Preferably, about 5 to 20%, based on the total weight of flour, of the controlled swelled starch is used but improved baking properties are obtained when about 1 to 40%, based on the total weight of flour, of the starch of the invention is substituted for untreated flour in conventional baked good mixes.

The above process can be practiced on starch from all types of sources such as wheat, corn, potatoes, etc.

It is an important aspect of the present invention to combine the heat-treated flour of the invention with the controlled swelled starch of the invention to give products with properties such as texture, grain, and eating quality which are superior to those properties of products prepared separately from either the flour or starch of the invention. Usually, about 3 to 15 parts of heat-treated flour are used per part of controlled swelled starch.

EXAMPLES

The invention is further demonstrated by the following illustrative examples.

Example 1

Heat Treatment of Unbleached Flour

Unbleached cake flour (100 g.) was stored in a closed container at a temperature of 71° C. for 4 days.

The so-prepared flour was used in the preparation of white layer cakes according to the following recipe:

| Ingredient | Weight (g.) |
| --- | --- |
| Cake flour | 100* |
| Sugar | 120 |
| Cake shortening | 50 |
| Dry non-fat milk solids | 12 |
| Dried egg whites | 9 |
| Baking powder | 7 |
| Salt | 3 |

-continued

| Ingredient | Weight (g.) |
| --- | --- |
| Water | 135 |

*14% moisture content

The raw cakes were baked at 190° C. for 24 minutes.

Cakes were also prepared using bleached flour and unbleached flour. Of course, these cakes are not in accordance with the invention and are included only for comparative purposes.

The cake volume, grain, texture, and eating quality of the above cakes were determined; the results are summarized below.

| Flour Used | Cake Volume (cc) | Grain* | Texture* | Eating quality |
| --- | --- | --- | --- | --- |
| Heat-treated at 71° C. for 4 days | 1090 | 18.0 | 17.8 | good, moist |
| Bleached (control) | 1085 | 18.5 | 18.5 | good, slightly dry |
| Unbleached (control) | 955 | 16.5 | 16.5 | very pasty |

*20 point scale, visual observation

Example 2

Controlled Swelling of Starch

Starch (1 kg.) was mixed with 5 l. of water and heated at 60° C. for 10 seconds. The slurry was cooled by means of a plate-type heat exchanger. The starch was recovered by centrifuging the slurry in a De Laval disc-type high speed solid discharger centrifuge. The so-collected solids were freeze-dried and ground to pass 40 mesh screen in a Wiley Mill.

Cakes were prepared as described in Example 1. The starch from above was employed, replacing 20% of unbleached flour in the afore-mentioned recipe. The results are tabulated below.

| Flour Used | Cake Volume (cc) | Grain | Texture | Eating Quality |
| --- | --- | --- | --- | --- |
| 20% controlled swelled starch plus 80% unbleached flour | 1055 | 17.3 | 17.5 | good, moist |
| Unbleached flour (control) | 995 | 16.5 | 16.8 | pasty |
| Bleached flour (control) | 1060 | 18.5 | 18.3 | good, slightly dry |

Example 3

Blend of Heat-treated Flour and Controlled Swelled Starch

The recipe described in Example 1 was followed. The results are summarized in the following table. Flours used were:

A—80% heat-treated flour (from Example 1) plus 20% controlled swelled starch (from Example 2)
B—Heat-treated flour (from Example 1)
C—Bleached flour (control)
D—Unbleached flour (control)

| Flour Used | Cake Volume (cc) | Grain | Texture | Eating Quality |
| --- | --- | --- | --- | --- |
| A | 1050 | 18.3 | 18.3 | very good, moist and tender |
| B | 1115 | 18.0 | 18.0 | good, moist |
| C (control) | 1060 | 18.5 | 18.3 | good, slightly dry |
| D (control) | 965 | 16.0 | 16.0 | very pasty |

Having thus described our invention, we claim:

1. A process for preparing a flour-starch mixture suitable for use in producing high-sugar baked goods of good volume, texture, grain, color, and eating quality, which comprises the steps of
    (a) heating unbleached wheat flour at a temperature of about 49°–93° C. for a period of about one hour to ten weeks,
    (b) mixing starch with water to form a slurry and heating the slurry at a temperature of about 54°–71° C. for a period of time sufficient to swell the starch granules without causing fragmentation thereof, and
    (c) mixing the so-heated flour with the so-treated starch in the proportion of 3 to 15 parts of flour per part of starch.

2. The process of claim 1 wherein the starch is mixed with about 1 to 10 parts of water per part of starch.

3. The process of claim 1 wherein the slurry is heated for a period of about 10 to 60 seconds.

4. The process of claim 1 wherein the slurry, after heating, is treated to remove the water which was added to form the slurry therefrom prior to mixing with the so-heated flour.

* * * * *